United States Patent

Lubin

[15] 3,662,920
[45] May 16, 1972

[54] PARTS FEEDER AND METHOD

[72] Inventor: Arnold I. Lubin, 8485 Woodcrest Drive, Apt. 4, Westland, Mich. 48185

[22] Filed: May 13, 1970

[21] Appl. No.: 36,844

[52] U.S. Cl. ............................................221/162, 221/254
[51] Int. Cl. .........................................................B23q 7/12
[58] Field of Search ..............................221/157-165, 172, 221/254

[56] References Cited

UNITED STATES PATENTS

| | | | |
|---|---|---|---|
| 1,944,360 | 1/1934 | Meyer | 221/160 X |
| 1,589,939 | 6/1926 | Case | 221/165 X |
| 2,754,860 | 7/1956 | Moore | 221/160 X |
| 3,346,095 | 10/1967 | Dixon | 221/162 X |
| 590,463 | 9/1897 | Plopper | 221/165 |

*Primary Examiner*—Robert B. Reeves
*Assistant Examiner*—Thomas E. Kocovsky
*Attorney*—Burton and Parker

[57] ABSTRACT

Disclosed is a method of and apparatus for feeding small parts in a pre-determined orientation from a hopper containing an unoriented mass of the parts wherein the hopper is stationary and has downwardly sloping bottom walls for gravity feeding the parts to the lowest point of the hopper and with an elevator tube extending upwardly through the hopper from such lowest point to the upper end of a downwardly and outwardly sloping parts orienter, and in which the tube opens laterally through a slot into the hopper along one side and opens laterally on the other side at its upper end toward the orienter, and with an elevator reciprocable in the tube and having a sloping parts elevating platform and a gate depending from the platform to close the slot upon ascent of the elevator and with the platform shiftable along the tube from a position at the lowest point of the hopper, where parts gravity flows into the tube above the platform, upwardly to a position for gravity discharging parts through the lateral opening at the upper end of the tube toward the orienter.

7 Claims, 12 Drawing Figures

Patented May 16, 1972

INVENTOR
ARNOLD I. LUBIN
BY
Burton & Parker
ATTORNEYS

Patented May 16, 1972

INVENTOR
ARNOLD I. LUBIN
BY
Burton & Parker
ATTORNEYS

Patented May 16, 1972
3,662,920
4 Sheets-Sheet 1
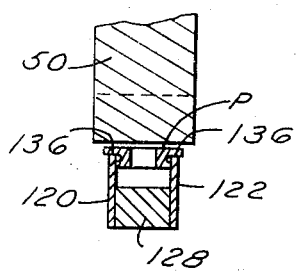
FIG.6
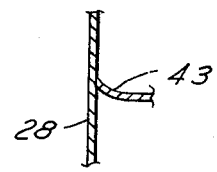
FIG.7
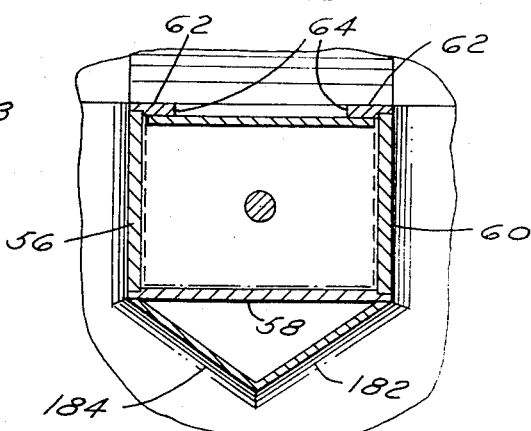
FIG.8
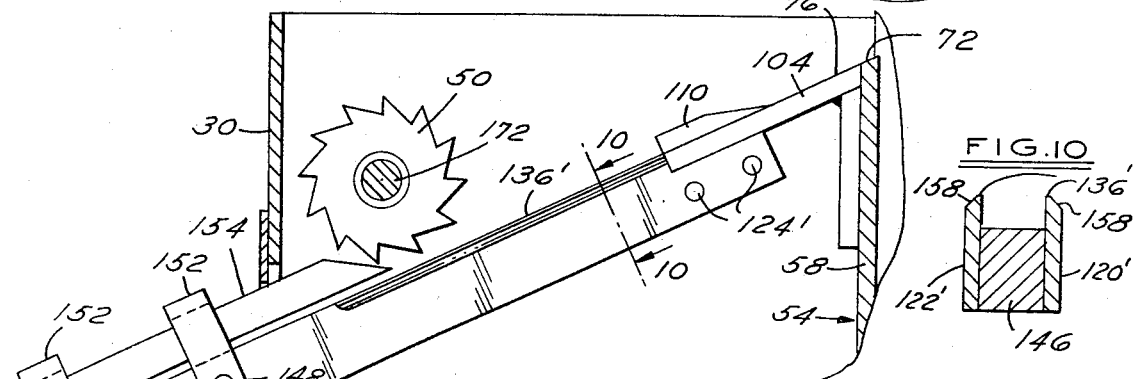
FIG.9
FIG.10
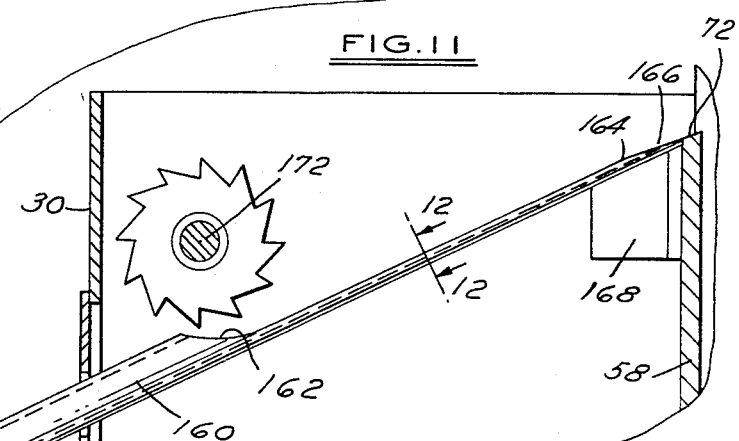
FIG.11
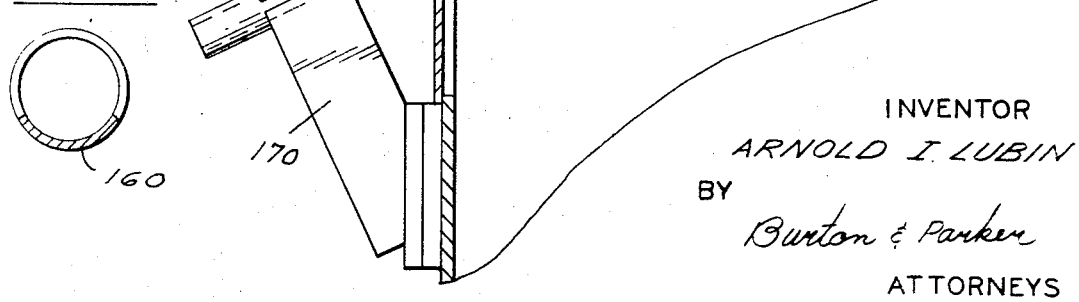
FIG.12
INVENTOR
ARNOLD I. LUBIN
BY
Burton & Parker
ATTORNEYS

PARTS FEEDER AND METHOD

FIELD OF INVENTION

This invention relates to a method of and apparatus for feeding parts in a pre-determined oriented relation from a mass of unoriented parts and is particularly well suited for delivering parts in a pre-determined orientation to automatic equipment which receives and utilizes the parts in automatic machines or the like.

BACKGROUND OF THE INVENTION

In general there are three types of parts feeders and methods of parts feeding in commercial use today: vibratory, oscillatory and rotary. The vibratory feeder utilizes a vibrating bowl holding the parts to be fed and provided with a helical orienting track on its inner wall surface which the parts "climb" and by means of which they are oriented as a result of the vibrating action. The oscillatory feeder utilizes a swingable hopper holding the parts to be fed and from which an outwardly and downwardly stationary track extends such that as the container swings between downward and upward positions parts are dumped onto the end of the track to be oriented therein and slide by gravity down it and out of the feeder. In the rotary feeder, a rotating drum receives the parts to be fed and an orienting track extends into the drum, and as the drum rotates parts are dumped onto the inner end of the track and slide by gravity down it out of the feeder.

A major disadvantage of these feeders and such methods of feeding parts arises from the fact that all the parts in the bowl, hopper or drum are continuously agitated or tumbled and this leads to varying degrees of wear and damage to the parts depending on their character. In addition these types of feeders are noisy as the parts are continuously or rhythmically agitated or tumbled.

A primary object of my invention is to reduce wear and damage to the parts to be fed and a concomitant object is to substantially reduce the operating noise level of parts feeding operations.

Another object is to provide a parts feeder of low cost and which requires minimum maintenance.

SUMMARY OF THE INVENTION

In accomplishing the foregoing objects I provide a stationary hopper containing the parts to be fed, a stationary track extending into the upper end of the hopper, and an elevator periodically reciprocable through the hopper from the bottom thereof which carries parts upwardly and unloads them on the track. The mass of parts in the hopper is, as a consequence, not subjected to the agitation and wear as in the prior art feeders previously mentioned. Only those parts actually being delivered to the track are involved in any substantial movement and the design is such that this movement is relatively gentle and does not give rise to wear or abrasion of the parts. The elevator operates in a tube open at its lower end to allow parts to enter above the elevator, and the elevator then lifts the parts on it upwardly through the tube in isolation from the remaining parts in the hopper and deposits them on a spillway leading to the track. Those parts not entering the track or improperly oriented therein fall back into the hopper. The noise level is low and damage to parts eliminated.

BRIEF DESCRIPTION OF THE DRAWINGS

FIG. 6 is a cross-sectional view beneath a clearing wheel taken on the line 6—6 of FIG. 3;

FIG. 7 is a fragmentary cross-sectional view through walls of the hopper taken on the line 7—7 of FIG. 3 which typifies the smooth blending of the side and bottom walls of the hopper;

FIG. 8 is a cross-sectional view through the elevator tube taken on the line 8—8 of FIG. 1;

FIG. 9 is a fragmentary cross-sectional view through a portion of the feeder showing in side elevation one form of parts orienting mechanism;

FIG. 10 is a cross-sectional view taken on the line 10—10 of FIG. 9;

FIG. 11 is a fragmentary cross-sectional view through the upper portion of the feeder showing another form of parts orienting mechanism; and FIG. 12 is a cross-sectional view taken on the line 12—12 of FIG. 11.

DESCRIPTION OF THE PREFERRED EMBODIMENTS

Figure 1:
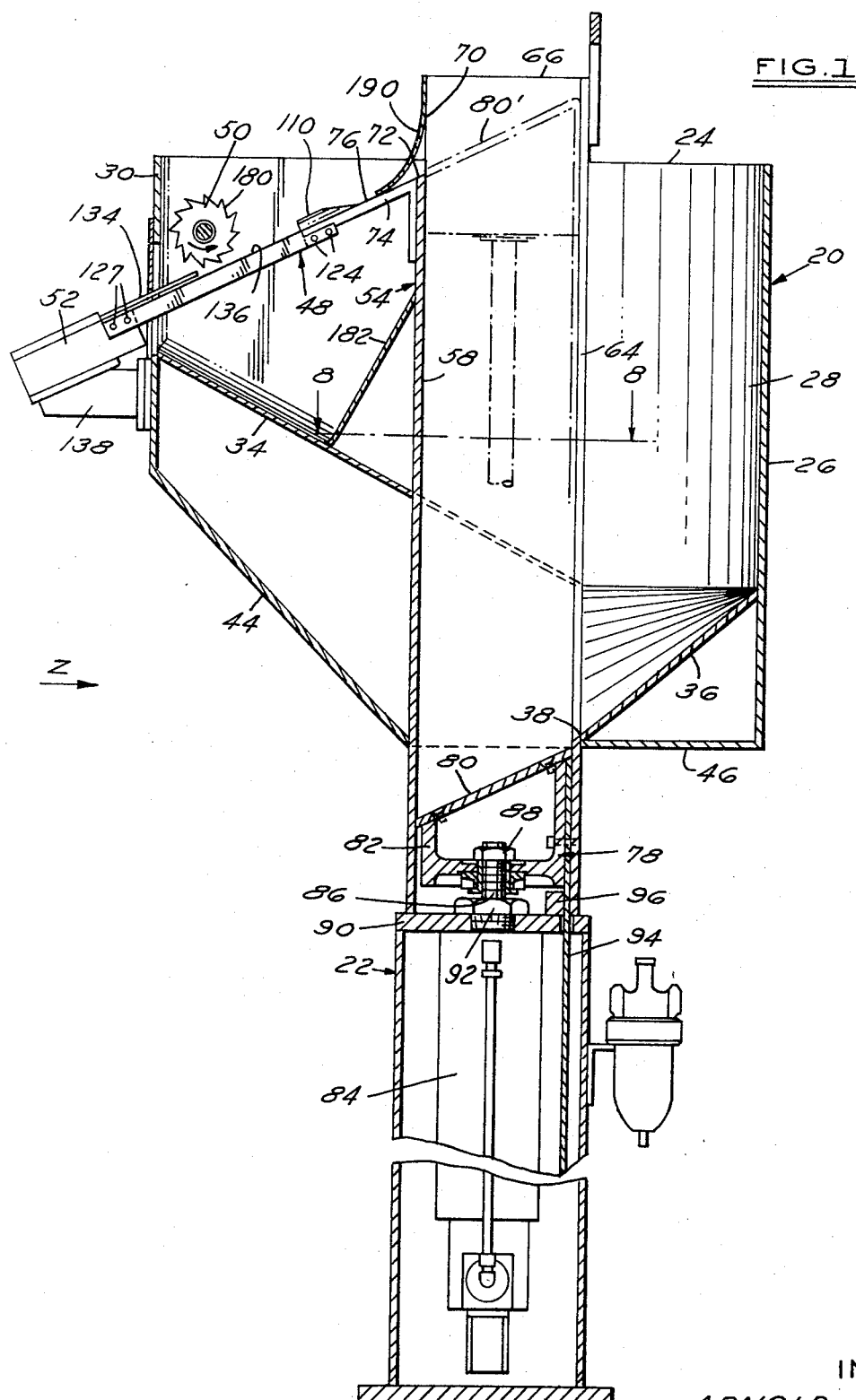
FIG. 1 is a side elevation partially in section of a feeder, embodying the invention, taken along the line 1—1 of FIG. 3.
Figure 2:
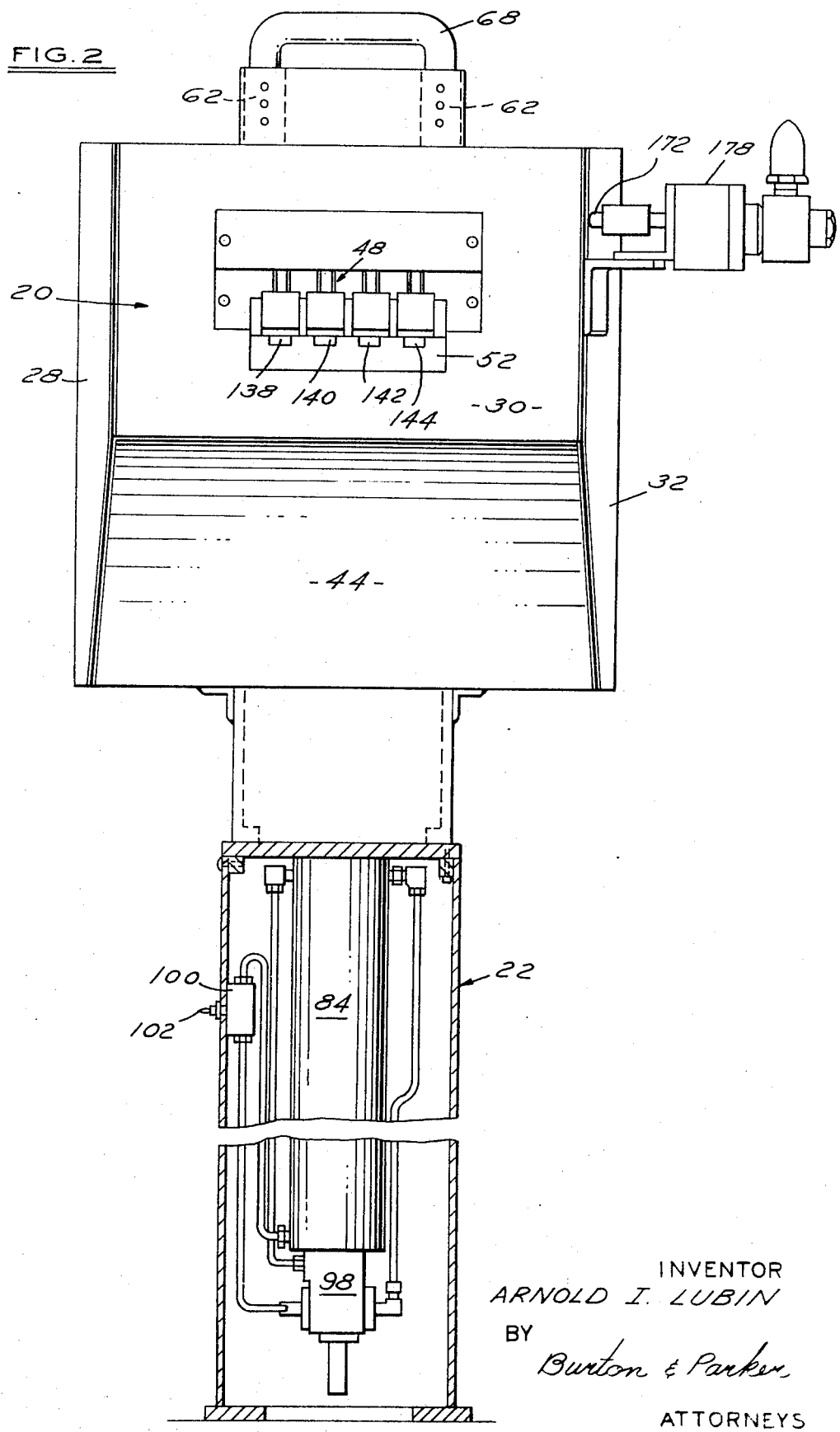
FIG. 2 is a front elevation of the feeder shown in FIG. 1 looking in the direction of arrow 2 in FIG. 1.

As shown in FIGS. 1 and 2 the parts feeder includes a hopper 20 which may be supported above the floor on a pedestal or the like 22. The hopper is adapted to receive through its open upper end 24 the parts to be fed. The hopper includes sidewalls 26, 28, 30 and 32 and is closed at the bottom by downwardly sloping walls 34 and 36 for gravity feeding parts in the hopper to the lowest point 38 thereof. The walls 34 and 36 are blended smoothly together by the cove walls 40 and 42 and are blended smoothly with the side walls as at 43 to provide a smooth gravity flow of the parts in the hopper to the lowest point 38. For purposes of structural rigidity the side walls 26, 28, 30 and 32 extend below the bottom walls 34 and 36 and connect with supplementary bottom walls 44 and 46.

Means are provided, as shown in FIG. 1, for orienting and feeding parts from the hopper and such means include a downwardly sloping parts orienting portion 48 at the upper end of the hopper arranged in non-oriented parts spilling communication with the interior of the hopper. Such means also includes a non-oriented parts clearing mechanism 50 for sweeping from portion 48 parts not properly oriented and causing them to spill off portion 48 back into the hopper. A feed block 52, communicating with the lower end of portion 48, is provided for the purpose of allowing feed tubes or the like, not shown, to be connected for carrying oriented parts away from the hopper and to the device or devices to be supplied with the oriented parts in a manner well understood in the art.

An elevator tube 54 extends between the bottom of the hopper and the upper end of said parts orienting portion 48 of the orienting means. The tube is shown in FIG. 1 as projecting through the bottom walls 34, 44 and 46 and is connected at its lower end below the hopper to the upper end of the pedestal 22. The tube is rectangular in cross-section as shown in FIG. 8 and includes vertical walls 56, 58, 60 and 62, and through the latter the tube opens outwardly laterally at 64 from the lowest point 38 of the hopper to the upper end 66 of the tube to admit parts in the hopper into the interior of the tube. The opening 64 is in the form of an elongated slot. The upper end 66 of the tube is re-enforced across the upper end of the slot 64 by a bridging member 68 secured to the wall 62 at opposite sides of the slot as shown in FIG. 2. The bridging member may also serve as a lifting handle by means of which the feeder may be picked up for movement from one location to another.

The upper end of the elevator tube 54 on that side opposite the wall 64 is provided with a lateral opening 70 which faces toward the downwardly sloping parts orienting portion 48. The opening 70 is formed by terminating wall 58 of the elevator tube at 72. Downwardly sloping parts orienting portion 48 is connected to wall 58 of the elevator tube with an upper surface 76 flush with the upper downwardly inclined edge 72 of the wall 58 as shown in FIGS. 9 and 11, forming a smooth path for gravity flow of parts thereover.

Within the elevator tube 54 is a vertically reciprocable elevator 78 which includes a parts elevating platform 80 inclined downwardly away from the slot 64 and toward the lateral opening 70 at the upper end of the tube. The elevator is shiftable between the lower position shown in FIG. 1 and the phantom outline position 80' at the upper end of the elevator tube. In its lower position the platform 80 is disposed to receive gravity flow of parts from the downwardly sloping bottom wall 36 of the hopper and is substantially aligned therewith to form a continuation thereof such that parts will enter the slot 64 to rest upon the platform 80. Upon elevation of platform 80 to the phantom outline position 80', parts above the platform will slide by gravity down the incline thereof and onto the upper surface 76 of the downwardly sloping parts orienting portion 48 of the parts orienting means. In the phantom outline position at the upper end of the elevator travel, the platform is substantially aligned with or slightly above the upper surface 76 and forms an upward extension thereof as shown in FIG. 1.

The platform 80 is mounted on an elevator head 82 secured to the upper end of power transmission means for vertically reciprocating the elevator, which means comprises a fluid pressure cylinder 84 disposed within the pedestal 22 and provided with a piston rod 86 to which the head 82 is secured as by a nut or the like 88 threaded on the upper end of the rod. The pedestal includes a cap plate 90 to which the upper end of the cylinder 84 is secured as by a nut 92.

The elevator includes a gate 94 depending from the platform and located within the tube 54 adjacent the wall 62 to overlie the slot 64 beneath the platform as the elevator ascends. The gate has a vertical dimension equal to the vertical travel of the elevator platform such that the slot 64 is closed beneath the platform to prevent the entry of parts in the hopper into the tube beneath the platform. A gate guide block 96 is mounted on the cap plate 90 to assist in guiding and holding the gate against the elevator tube wall 62. The gate may be secured to the head in any suitable fashion to move therewith.

The fluid pressure cylinder 84 is in the form of an automatically operating air motor of conventional construction. Suitable piping is provided as shown in FIGS. 1 and 2. At the lower end of the cylinder an automatic cycling valve 98 is provided which in combination with the piping serves to cause the piston within the cylinder to reciprocate by controlling admission and exhaust of air pressure to and from opposite ends of the cylinder, all in a manner well known in the art. Air pressure may be admitted to and exhausted from the air motor through a three-way valve 100 which includes a toggle lever 102 for manual operation of the elevator in one direction or the other. The automatic cycling valve 98, as is conventional, is provided with an adjustment for varying the length of time of the traverse of the piston within the cylinder from one end to the other, as a consequence of which the speed of operation of the parts feeder may be varied to accommodate the requirements of the device or devices to which oriented parts are fed by the feeder.

Figure 3:
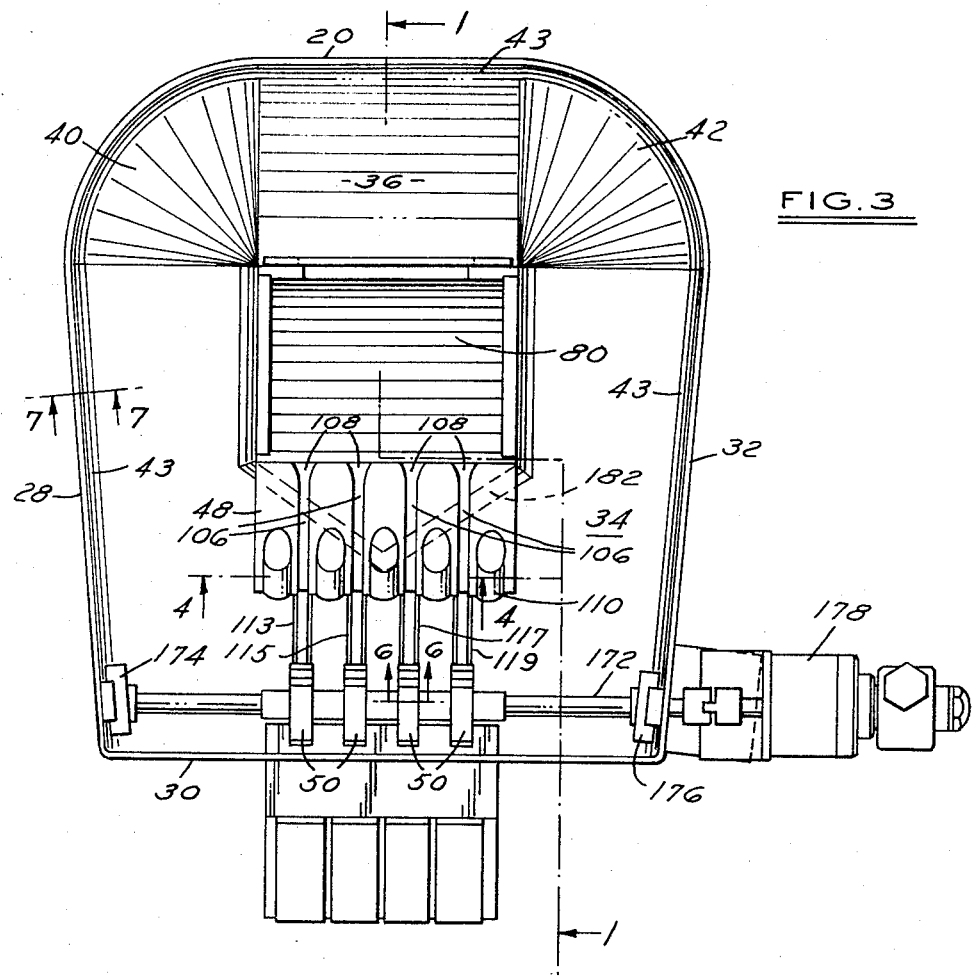
FIG. 3 is a top or plan view of the feeder shown in FIGS. 1 and 2.
Figure 5:
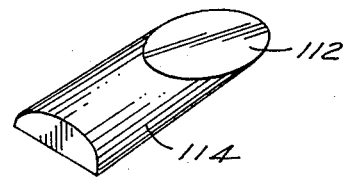
FIG. 5 is a perspective view of one of the parts deflecting cams.

While the feeder may be arranged to feed and orient a single file line of parts, it is shown herein arranged to orient and feed four separate lines of parts. In FIG. 3 the parts orienting portion 48 of the orienting means is shown as comprising an orienting plate 104 provided with four parallel grooves 106 which at their upper ends are widened out as at 108 to more readily receive and guide parts downwardly along the grooves. On opposite sides of the grooves and between them are arranged five parts deflecting cams 110 one of which is shown in FIG. 5. Each cam includes a bevelled end 112 and a convex upper surface 114. The cams are set into depressions 118 formed in the upper surface of the plate 104.

Figure 4:
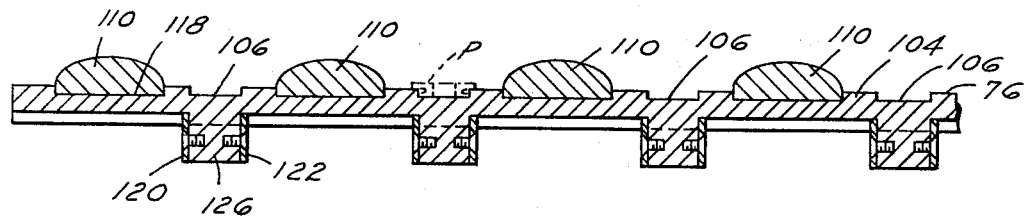
FIG. 4 is a cross-sectional view taken on the line 4—4 on FIG. 3.

The grooves 106 are sized to embrace determined surfaces of the parts to be fed to orient the parts. In FIG. 4 a representative part is shown in phantom outline at P. Such part is generally T-shaped in cross-section and may comprise a clinch nut. The base of the T-shape enters the groove 106 and the head thereof overlies the upper surface of the plate 104 as shown in FIG. 4. By suitable modification of the plate grooves 106 parts of different shapes may be fed, such as, but not limited to, bolts, screws, nails, headed pins or buttons, rivets and the like.

Joining the lower edge 118 of the plate 104 in parts receiving communication with the orienting grooves 106 are tracks 113, 115, 117 and 119 which in turn communicate at their lower ends with the feed block 52. Each track comprises a pair of parallel spaced apart plates 120 and 122 which are secured as by screws 124 to opposite sides of connecting blocks 126 on the under side of plate 104. The plates are spaced apart throughout their length by either a spacer block 128 as shown in FIG. 6, or an extension of the block 126 as desired. Block 126 is shown as integral with plate 104 but may be a separate element secured thereto in a convenient fashion. A track cover or guide 134 is provided spaced slightly above the upper edges 136 of the track to prevent parts in the track from accidentally jumping out and for other purposes well understood in the art.

The lower or downstream end of each track communicates with the feed block 52 which is provided with suitable parts feeding passages 138, 140, 142 and 144 (see FIG. 2) and with which the parts feed lines or conveyor means (not shown) communicate for carrying the parts to the devices utilizing them.

In some instances the feed block 52 may be omitted and different track configurations utilized as shown in FIGS. 6, 9, 10, 11 and 12. In FIG. 9 the track includes plates 120' and 122' secured in spaced apart relation as by screws 124' to a block on the underside of plate 104 as previously described. A spacer block 146 between the plates extends to their lower ends and is secured thereto by screws 148, some of which serve to connect the track to a supporting bracket 150 mounted on wall 30 and some of which serve to secure cover brackets 152 to the track supporting a cover member 154 spaced slightly above upper edges 136' of the track. The upstream end of the cover is bevelled at 156 adjacent the clearing wheel 50. Each track plate is bevelled at 158 to provide narrow upper edges 136' for supporting the parts with a minimum of frictional resistance to sliding therealong.

In FIGS. 11 and 12 another form of track is shown. This is particularly suited for feeding pins having a cylindrical shape. The track comprises a cylindrical tube 160 which is partially cut away from 162 to 164 and then cut at a bevel at 166 to blend smoothly into the edge 72 of the elevator wall 58. A bracket or support 168 secures the upper end of the tube 160 to the elevator tube while the lower end is supported by a bracket 170 secured to wall 30 of the hopper.

With the embodiments of FIGS. 9 and 11 the parts feed tubes or conveyors, not shown, are connected directly to the downstream or lower ends of the tracks or tubes 160 in any convenient fashion.

The clearing wheels 50 are mounted on a shaft 172 to revolve just above the tracks and remove therefrom parts not properly oriented in the tracks as is well understood in the art. The shaft is carried in bearings 174 and 176 and is driven in the direction of rotation shown by the arrow in FIG. 1 by a suitable motor 178. The saw-tooth periphery 180 of each wheel is spaced just above a part P properly oriented in the track as shown in FIG. 6.

A wedge-shaped parts deflecting wall 182 inclined downwardly from the elevator tube as shown in FIG. 1 and blending smoothly as at 184 with the bottom wall 34 of the hopper assists in returning parts spilling from the tracks and plate 104 to the lowest point 38 of the hopper.

During operation of the feeder, parts in the hopper enter the elevator tube above the platform 80 by gravity and as the platform ascends the parts above it in the elevator tube are raised and spillout through the lateral opening 70. A flexible skirt 190 of rubber or the like, secured to the upper end of the elevator tube and resting on the plate 74 over the lateral opening 70 serves to slow the rush of parts delivered by the elevator so that they will find their way into the orienting grooves 106 and thence into the track. By virtue of the incline of the platform and the downwardly sloping walls of the hopper, the feeder will completely empty itself. During ascent or descent of the elevator the mass of parts in the hopper are relatively undisturbed as they are isolated for the most part from the elevator movement by the walls of the elevator tube.

What is claimed is:

1. The method of orienting and feeding parts from a mass of unoriented parts comprising:

containing the mass of unoriented parts in a substantially quiescent condition, supporting the contained mass of parts on downwardly sloping surfaces such that the mass will slide downwardly by gravity, substantially isolating from the contained mass of parts a limited number sliding downwardly, elevating such limited number of parts upwardly through the remaining mass of parts while simultaneously maintaining such number in substantial isolation and without disturbing the remaining mass of parts, receiving such limited number from an elevated position above the contained mass of parts and orienting a portion of them and returning the unoriented parts to the top of the contained mass.

2. A parts feeder comprising:

a parts hopper having a downwardly downward sloping bottom for gravity feeding parts therein to the lowest point of the hopper, means for orienting and feeding parts from the hopper including a downwardly sloping parts orienting portion disposed in non-oriented parts spilling communication with the upper end of the hopper, a stationary elevator tube extending between the bottom of the hopper and said orienting portion and having side walls defining a first lateral opening into the hopper at said lowest point to receive therein the gravity feed parts and having a second lateral opening at the top angularly displaced around the tube from said first opening and facing toward said parts orienting portion to discharge parts theretoward, a reciprocable elevator in said tube including a platform inclined downwardly away from said first lateral opening and downwardly toward said second lateral opening and shiftable through the tube between a position disposed beneath parts entering said first lateral opening from said lowest point of the hopper and a position disposed at said second lateral opening for gravity discharge of parts on the platform through such opening, and said side walls of the tube isolating the elevator platform and the parts thereon from the majority of the parts in the hopper during reciprocation of the elevator.

3. The invention defined by claim 2 characterized in that said first lateral opening extends upwardly along the tube from the lowest point of the hopper to adjacent the upper end of the tube for admitting parts from the hopper into the tube.

4. The invention defined by claim 3 characterized in that said elevator means includes a gate depending from said platform and extending through the bottom of the hopper in a position to close said first lateral opening during ascension of the platform to prevent parts from entering the tube below the platform.

5. The invention defined by claim 4 characterized in that reciprocating power transmission means is disposed below the hopper and is connected to the elevator with a reciprocating drive part for reciprocably shifting the same.

6. The invention defined by claim 5 characterized in that said power transmission means comprises a vertically arranged fluid pressure cylinder and a piston rod extending from the upper end of the cylinder and through the bottom of the hopper and is connected to said platform, and adjustable speed control and reversing valve means are provided connected to the cylinder for varying the cycle time of the reciprocation of the piston rod.

7. The invention defined by claim 6 characterized in that said parts orienting means includes clearing wheel means disposed above said downwardly sloping parts orienting portion and clears and spills non-oriented parts back into the hopper.

* * * * *